(No Model.)  5 Sheets—Sheet 1.
J. B. GILCHRIST.
MACHINE FOR SAWING STONE.
No. 361,219.  Patented Apr. 12, 1887.
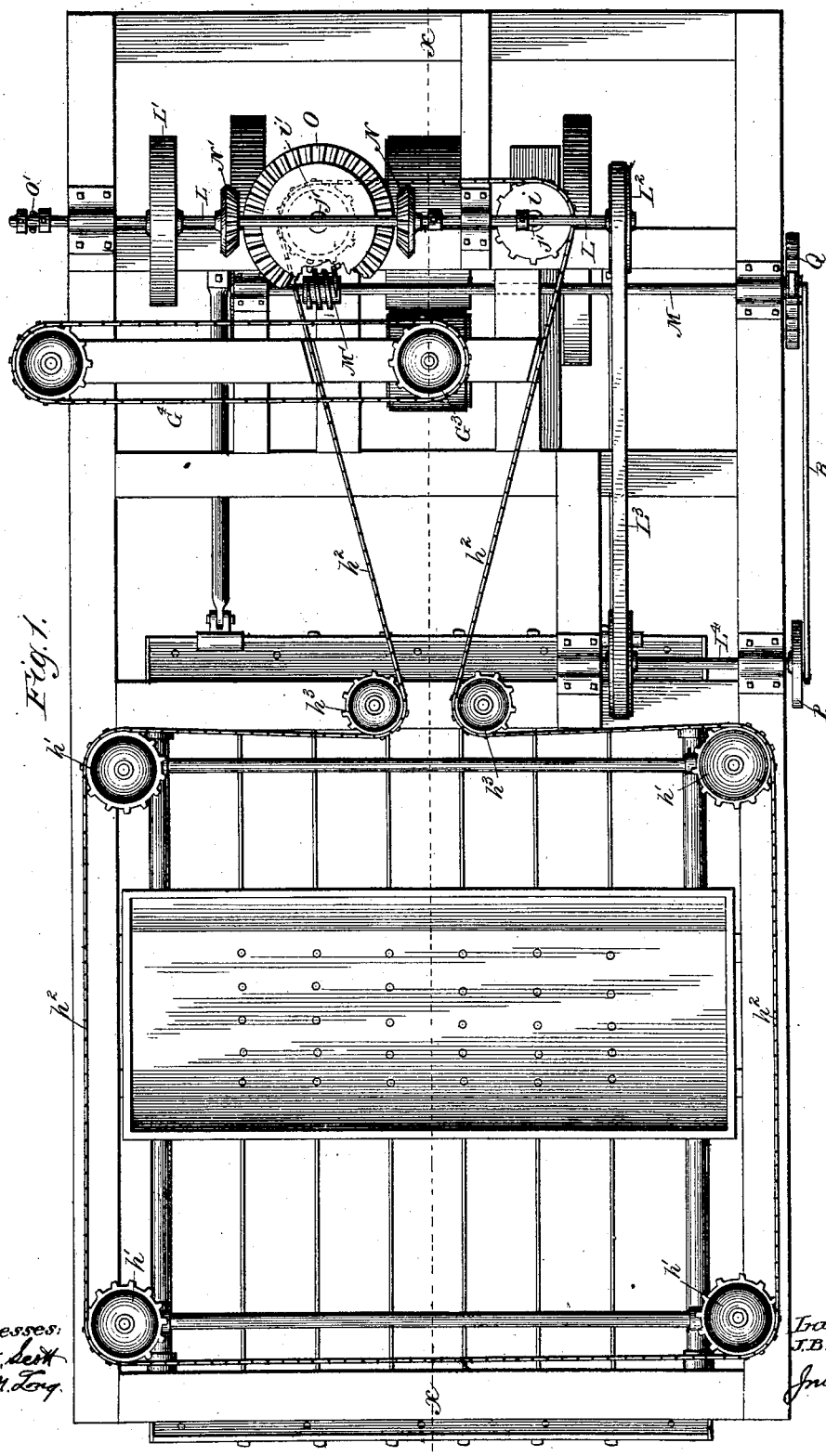
Witnesses:
Alex. Scott
A. M. Long
Inventor.
J. B. Gilchrist
Jno. G. Elliott
Atty.

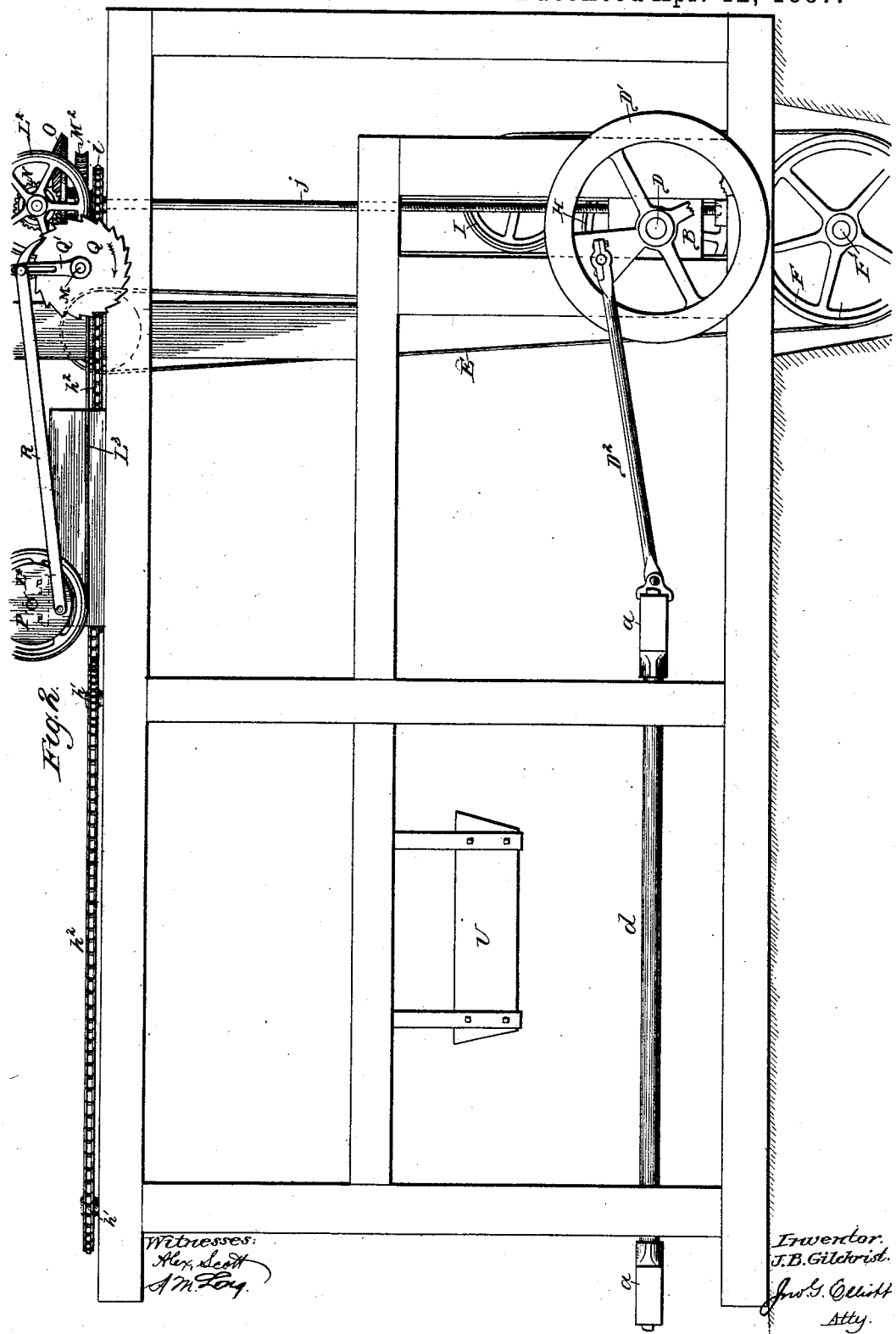

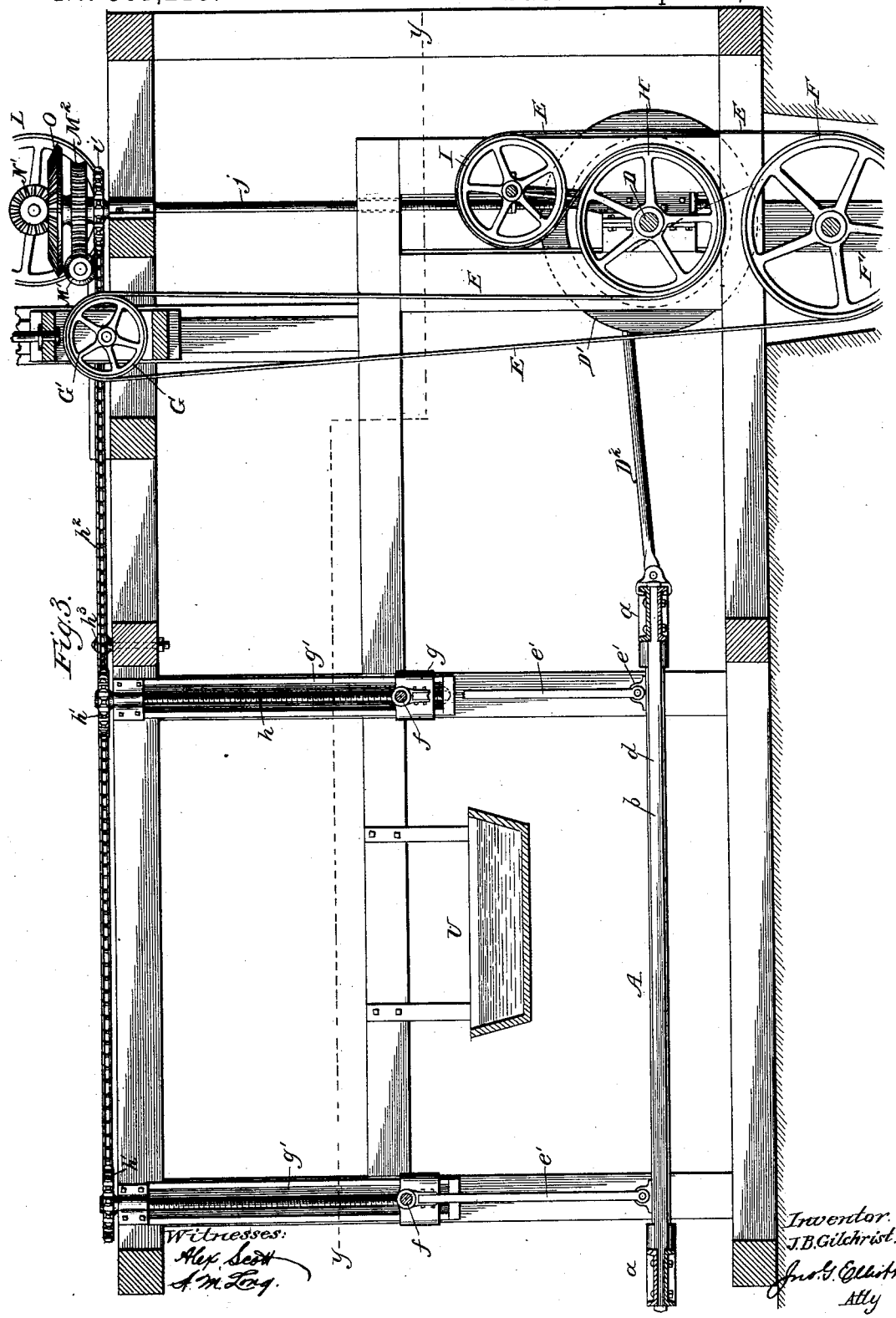

(No Model.) 5 Sheets—Sheet 4.
J. B. GILCHRIST.
MACHINE FOR SAWING STONE.
No. 361,219. Patented Apr. 12, 1887.
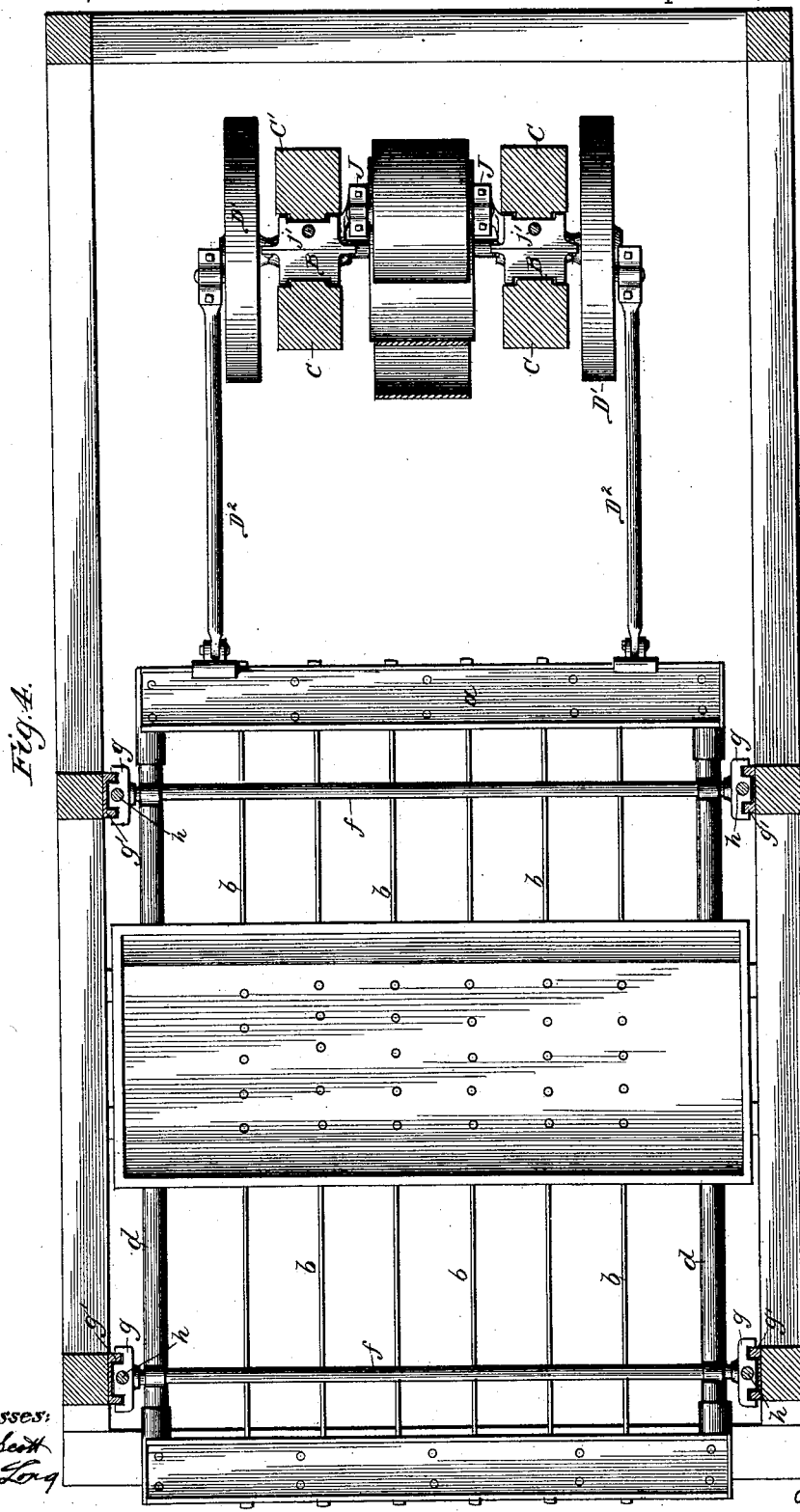
Witnesses:
Alex Scott
A. M. Long
Inventor:
J. B. Gilchrist
Jno. G. Elliott
Atty.

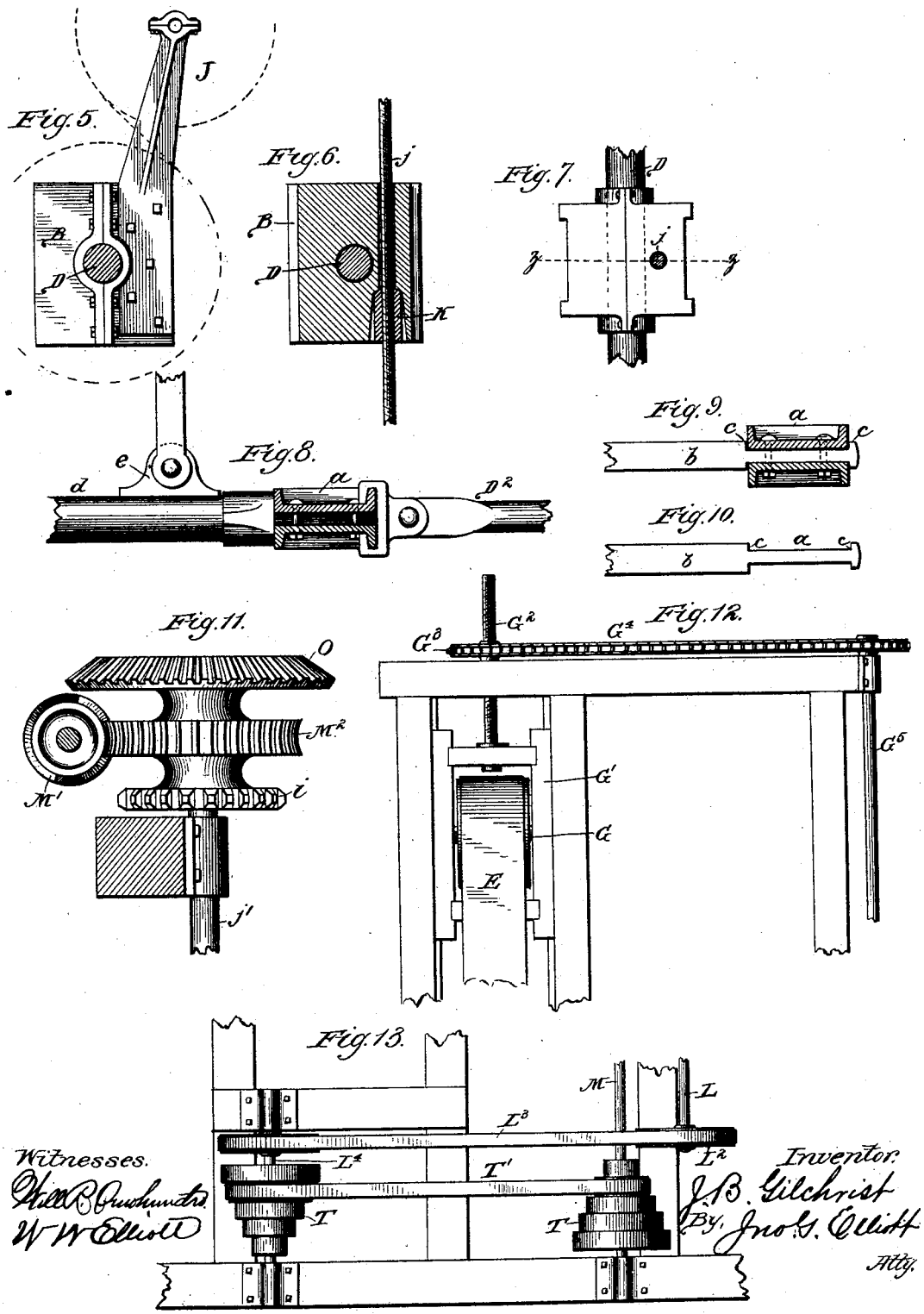

UNITED STATES PATENT OFFICE.

JOHN B. GILCHRIST, OF CHICAGO, ILLINOIS, ASSIGNOR TO JAMES ROBINSON AND ELIZA GILCHRIST, BOTH OF SAME PLACE.

MACHINE FOR SAWING STONE.

SPECIFICATION forming part of Letters Patent No. 361,219, dated April 12, 1887.

Application filed May 2, 1885. Serial No. 164,155. (No model.)

*To all whom it may concern:*

Be it known that I, JOHN B. GILCHRIST, a citizen of the United States, residing in Chicago, county of Cook, and State of Illinois, have invented certain new and useful Improvements in Machines for Sawing Stone, of which the following is a specification.

This invention relates to improvements in machines for sawing stone in which a gang of reciprocating saws are employed, and means are provided for not only regulating the depth of cut of the saws, but also their impinging force of contact with the stone to be cut, in order to increase or diminish their cutting effect.

Among the objects of this invention are a more perfect and uniform adjustment of the saws within a wide range of adjustment relative to the stone to be cut, in order that not only the saws may be caused to exert any desired depth of cut at each stroke within reasonable limits, but shall uniformly be maintained throughout the entire cutting operation at whatever adjustment they may be set, and to have such an adjustment of the saw-frame and the crank and drive wheel mechanism for swinging the same that during the vertical adjustment of the frame the lowest position of the said frame, which is substantially its position when the cut is made, will be maintained in a center line relative to the center of the drive-wheel, whereby the length and direction of the stroke of the saw-frame are rendered uniform throughout the cutting operation.

Further objects are to have in such a saw-mill such a connection between the driving-belt and the balance-wheel and pitmen that, notwithstanding the constantly-shifting position of the balance-wheel, no slack or tightening shall occur in the belt more or less than it was originally given. To provide for adjusting the tension of the driving-belt at any time without stopping the operation of the machine; and, finally, to render such a machine simple in construction and operation and at the same time durable by means of certain details of construction, hereinafter described, and shown in the accompanying drawings, in which—

Figure 1 represents a top plan view of a stone-cutting machine embodying my invention; Fig. 2, a side elevation of the same; Fig. 3, a longitudinal section of the same on the line $x\,x$ of Fig. 1; Fig. 4, a horizontal section on line $y\,y$ of Fig. 2; Fig. 5, a detail side elevation of the sliding bearing for the fly-wheel and the movable belt-wheels; Fig. 6, a central section of the same on lines $z\,z$ of Fig. 7; Fig. 7, a plan view of said sliding bearing; Fig. 8, a detail, partly in section, showing the connection of the pitman with the saw-frame; Fig. 9, a detail section showing the connection of the saw-blades with the frame; Fig. 10, a detail of one of the saw-blades; Fig. 11, a side elevation of the gearing actuating the sliding bearing of the drive-wheel and the mechanism lowering and regulating the depth of cut of the saws; Fig. 12, a detail side elevation showing the devices employed for adjusting the tension of the driving-belt; Fig. 13, a plan view of a modification of the means for adjusting the depth of cut of the saws.

Similar letters of reference indicate the same parts in the several figures of the drawings.

The supporting-frame in a machine of this character is substantially rectangular in form and composed of heavy beams securely bolted together. Working mainly within this frame is the saw-carriage A, the frame of which in the present instance has its end bars, $a$, each composed of two opposing angle-irons (see Figs. 3 and 9) bolted together, but with sufficient space between them for the saw-blades $b$, which bolts are relieved from a lateral strain by forming said blades with shoulders $c$, bearing against the sides of the angle-irons. The sides $d$ of this frame (see Fig. 8) are composed of metal piping, but may be bars of wood, on which are lugs $e$, toward each end, forming pivot-bearings for hanger-bars $e'$, provided at their upper ends with eyes sleeved on shafts $f$, which extend transversely across the carriage, and secured to a sliding block, $g$, working upon a suitable guide, $g'$, secured to side and vertical standards of the frame.

Working in the block $g$, with an end bearing at the bottom of the guide, are screw-threaded shafts $h$, which project through a suitable bearing to above the top of the frame, at which point said screw-shafts are provided with sprocket-wheels $h'$, which, when turned, actuate the screw-threaded shaft and raise or lower the carriage, as the case may be. It is, however, desirable that the vertical adjustment of the saw-carriage should be uniform, and to this end all of said sprocket-wheels are connected and actuated by means of a sprocket-chain, $h^2$, which is continuous, and which passes (see Fig. 1) over the opposing faces of two sprocket-wheels, $h^3$, and thence around sprockets $i$ and $i'$ at the rear end of the machine, the latter of which sprockets is shown in dotted lines in Fig. 1 and in full lines in Fig. 2.

The sprockets $i$ $i'$ are respectively secured upon parallel and vertical screw-threaded shafts or rods $j$ $j'$, which (see Fig. 3) work in boxes B, preferably composed of two parts, as shown in Figs. 5 and 7, and provided with side flanges which embrace and guide said boxes between upright standards C' C' at the rear end of the machine. Journaled in these boxes is a shaft, D, which projects at both ends beyond the outer ends of the boxes and carries crank-wheels D' D', (see Fig. 4,) from which pitmen $D^2$ extend to and are pivoted on the saw-carriage in any suitable manner—as, for example, by being bolted between lugs fixed in the carriage. In this connection it may be observed that the shafts $j$ may be screw-threaded directly into the boxes B; but as there is unavoidably more or less a lateral movement of the boxes in their guides, which would tend to strain the threads upon the shaft, I prefer to provide said boxes with an enlarged bore, through which the shafts loosely pass, and to employ on the under side of said boxes a nut-block, K, provided with female screw-threads, embracing the threads of the shaft and having a convex end adjacent and bearing against the box, so that a lateral or vibrating movement of said box will be entirely upon the end of the block and not affect or transmit its lateral motion to the screw-threads of the shafts.

In practice it is proposed to core out the under side of the box B, as shown in Fig. 6, to receive the nut-block, which cored-out portion gradually decreases in width toward its inner end, and is of greater diameter than the nut-block, in order that the box may have the lateral vibration thereon before referred to.

In this class of machinery driving-belts are essential and indispensable to a successful and steady operation of the machine; but in the employment of such belts it is obvious that some means should be provided for preventing any substantial variation in their tension, by reason of the resulting rise and fall of the belt-wheels carried by the actuating-shaft of the pitman. As a means for attaining this result, belt E, passing around the main drive-shaft pulley F of the machine, passes thence over a pulley, G, toward or at the top of the frame, and thence downwardly under a pulley, H, on the shaft D of the crank-wheel, which said pulley (see Fig. 4) is midway the length of said shaft and between the standards.

The belt E passes thence partially over the pulley H, and thence around a pulley, I, to the main driving-pulley F, which pulley I is journaled in standards J, secured to and extending above the boxes B, which therefore always maintain the pulleys I in the same relative position to each other, and by this means, while said pulleys may be freely raised or lowered by means of the screw-rods J working in boxes, no change will be made in the tension of the belt, and hence its operation will always be uniform, notwithstanding the constantly-shifting position of the said two pulleys relative to the pulleys F and G. The pulley G is journaled in a sliding box or frame, G', (see Figs. 3 and 12,) in the upper end of which is swiveled a short shaft, $G^2$, screw-threaded and passing through a cross-bar at the top of the frame, and having a screw-threaded sprocket-wheel, $G^3$, which, by a sprocket-chain, $G^4$, connects with a similar sprocket on the end of a vertical rod, $G^5$, which may extend down the side of the machine within convenient reach of the attendant, who by turning the shaft may increase or diminish the tension of the belt E by raising or lowering the block G', and without having to mount the frame-work. If desired, however, the sprockets and chain may be omitted, and a crank-arm or other suitable hand device be applied direct to the sprocket $G^3$ for adjusting it.

Journaled in suitable bearings on top of the machine and above the sprockets $i$ $i'$ is a horizontal shaft, L, upon which is a pulley, L', which, though not so shown, is connected by a belt with the main drive-shaft F'. (Shown in Figs. 2 and 3.) On the other end of the shaft L is a pulley, $L^2$, connected by a belt, $L^3$, with a similar pulley on a short shaft, $L^4$, toward the forward part of the machine, as shown in Fig. 1, from which latter shaft motion is imparted to a shaft, M, on which is a worm, M', meshing with a gear, $M^2$, (see Figs. 1 and 11,) rigid on the shaft $j'$. From this it will be seen that when motion is imparted to the shaft M' the sprocket-chain of the saw-carriage will be set in motion, and that the motion of said chain will depend for its uniformity upon that of the shaft $j'$; but it is obvious that the motion of the shaft M should be much slower than that of the shaft L or the screw-rod $j'$, and that the velocity of the shaft L is much greater than either the rod or the shaft M.

By this construction and arrangement it will be seen that there is such a connection between the adjusting-rods for vertically adjusting the carriage and the pitman that the pitman and its crank-wheel are not only lowered with the carriage, but simultaneously and uniformly therewith, and as a result the same direction of stroke, or rather the same plane of stroke, of the pitman, and hence of the saws, is maintained throughout the entire sawing operation of the stone. This simultaneous adjustment of the carriage and the pitman not only relieves the carriage and pitman from an irregular and varying stroke and the resulting strain, but produces an evenness or uniformity in the sawing of stone which cannot be successfully and automatically accomplished without such a simultaneous adjustment. It is proposed, however, to utilize the rapid velocity of the shaft M for the purpose of lowering or raising at will, and rapidly, when occasion demands, the saw-carriage and its actuating mechanism, and to this end the shaft L has secured on it the bevel-gears N N', (see Fig. 1,) which are of sufficient distance apart to be, when the machine is in operation, without contact with a large bevel-gear, O, on the screw-shaft $j$, but may be shifted by reciprocating shaft L, so as to throw either one or the other of said bevel-gears N N' in engagement with the gear O to raise or lower the saw-carriage and its actuating mechanism, as the case may be. For convenience in reciprocating said shaft without mounting the machine, it is provided at one end, as indicated in Fig. 1, with a lever, O', which extends downwardly within convenient reach of the attendant. By this arrangement much time is saved in elevating the saw-carriage above the sawed stone and in position for free operation, or for lowering the same when too high to operate upon a fresh stone.

In all stone-sawing machines it is desirable to reciprocate the saw-carriage at all times at about a uniform velocity, whether the stone be hard or soft; but to render such machines effective it is also necessary that the vertical adjustment of the saws should correspond with the hardness or softness of the stone, and, so far as is now known, no such means have been provided, and as a result the actual and full capacity for work of such a machine has never been attained where there is a variation in the degree of hardness of the stone to be sawed by the same machine. It is therefore one of the main objects of this invention to cure this defect in this class of machines, and to this end I have provided means whereby the force of the stroke of the saws may be determined and maintained throughout their operation upon the stone. I accomplish this result by either one of two peculiar connections between the shafts $L^4$ and M, which I will now describe.

Shaft $L^4$ is provided upon its outer end with a crank-disk, P, (see Figs. 1 and 2,) and shaft M is similarly provided with a ratchet-wheel, Q, outside of which and on the end of the shaft is sleeved a slotted arm, Q', which, in its operative position, stands substantially upright. The crank-disk P is connected with the ratchet-wheel Q by a lever, R, having pivoted on its end next the ratchet-wheel a pawl, S, the pivot connecting said pawl and lever passing through and working in the slot in the upright arm. With such a connection between the shafts $L^4$ and M, it will be seen that as the crank-disk is revolving about shaft $L^4$ the pitman will be reciprocated, and, engaging the pawl with the teeth in the ratchet-wheel, will revolve said wheel intermittently, but uniformly, and cause through the medium of the worm-gear M' a corresponding movement or velocity on the part of the drive-chains and the shafts $j$ $j'$, whereby the carriage and the boxes B are simultaneously lowered uniformly.

The slotted bearing in the upright arm for the pivot provides means for determining the movement of the shaft M, and with it the adjustment of the saw-carriage and sliding box, for if the pivot connecting the lever R and pawl S is at the upper end of the slot, as shown in Fig. 2, the stroke of the pawl will be sufficient to engage, say, with every third or fourth tooth, with each rotation of the crank-disk or reciprocation of the lever, and as the pivot is moved toward the lower extremity of the slot, and hence toward the center or axis upon which the upright arm and ratchet-wheel turn, the stroke of the pawl with reference to the teeth is correspondingly shortened, so that when the pivot is at the bottom of the slot the pawl engages each tooth in its order, and correspondingly reduces the movement of the saw-carriage and the sliding block.

The range of adjustment or variation in the movement of the carriage and sliding block is more or less limited by the employment of such a device; but almost any range of adjustment, and hence pressure of the saws and their depth of cut on the stone, may be attained by the employment of cone-pulleys T T, (shown in Fig. 13,) connected by a belt, T', as a substitute for the pawl and ratchet before described, for any number of such pulleys and of any variation in degree of diameter may be employed to that end, so that by shifting their connecting belt any desired or required velocity can be given the several parts connected with and actuating the saw-carriage and the sliding box.

When employing the pawl-and-ratchet connection to the shafts $L^4$ and M, it will of course be necessary to disconnect the pawl when it is desirable to actuate the carriage and sliding box directly through the large bevel-gear O; but this may be done simply by elevating the pawl, which, when in operation, is preferably held in contact with the ratchet by means of any suitable spring, not necessary to here be shown, but any disconnection of parts when the cone-pulleys are substituted for the ratchet-connection will be unnecessary.

To moisten the stone and the sand or other grit fed to it during the sawing operation, a water-trough, U, suspended from some fixed portion of the frame over the stone by means of hangers or other connecting devices, is employed, which trough may be provided with any means for controlling the flow of water therefrom.

While I have shown and described link-chains and sprocket-wheels for connecting and actuating the several parts of the machine, I do not limit myself to such connections, for I may employ shafting and gears, though I find in practice that the construction shown is preferable.

Among the advantages common to my invention, and which have not been hereinbefore stated, are that, by a simultaneous and any desired adjustment of the carriage and the devices for actuating it, I am enabled to at any time increase or diminish the depth of cut of the saws upon the same stone, and by this means promote rapidity in sawing a single stone in which there are stratums varying in softness, which advantages and all others herein mentioned have been fully demonstrated by a machine which now is and has been for some weeks in practical operation.

In practice it is proposed to load the stone upon a suitable carriage mounted upon a track which may be pushed under and withdrawn at will from the saw-carriage, and it is also proposed to have suitably-elevated platforms, by means of which sand and other grit can be readily supplied to the stone during the cutting operation.

Having described my invention, what I claim, and desire to secure by Letters Patent, is—

1. The swinging and vertically-adjustable saw-carriage, the pitmen, the crank-wheels and the sliding-boxes thereof, the belt-pulleys H and I, mounted on said boxes, the driving-pulley F, and pulley G, in combination with a belt passing from over the pulley G, thence under pulley H, over pulley I, and thence under pulley F back to pulley G, the adjusting-rods of the box and carriage, and a connecting mechanism between and simultaneously actuating said rods, substantially as described.

2. The swinging carriage, the adjusting-rods extending above the carriage and sprocket-wheels on the upper end of said rods, the pitmen, the sliding boxes beyond the end of the carriage, the adjusting-rod for said boxes, and the sprockets on said rods, in combination with a single sprocket-chain engaging all of the sprockets of said several adjusting-rods, and means for actuating said sprocket-chain, substantially as described.

3. The saw-carriage, the adjusting-rods, the sprockets thereof, the pitmen, the sliding boxes, the adjusting-rod thereof, and the sprockets on said rod, in combination with a single drive-chain connecting all of said sprockets, a bevel-gear upon the adjusting-rod of the pitman, and a reciprocating drive-shaft and bevel-gears thereon, substantially as and for the purpose described.

4. The pitmen, the sliding boxes thereof, the swinging saw-carriage, and means for vertically and simultaneously adjusting said carriage and pitmen, in combination with a connection, substantially as described, between the adjusting devices of the carriage and pitmen for determining and regulating the rapidity of the descent of the pitmen and the carriage, whereby the depth of cut of the saws may be varied, substantially as described.

5. The pitmen, the sliding boxes and adjusting screw-rod thereof, the saw-carriage and its adjusting screw-rod, the sprockets of said adjusting-rods, and the chain-connection between said sprockets, in combination with the shaft L, the shaft $L^4$, a belt-connection between said shafts, a shaft, M, for actuating the adjusting-rods of the pitmen and carriage, and a connection between the shafts $L^4$ and M, whereby the velocity of the shaft M may be varied or maintained at any predetermined rate, substantially as described.

6. In a stone-sawing machine, the drive-shaft L, the shaft $L^4$, and a connection between said shaft and the shaft L, in combination with the shaft M, the cone-pulleys upon said shaft and the shaft $L^4$, and a belt-connection between said cone-pulleys, whereby the velocity of the shaft M may be increased or diminished relative to the velocity of the shaft $L^4$, substantially as described.

7. In a machine for sawing stone, the pitmen, the carriage, the pulleys F, H, and I, and the belt, in combination with the pulley G, the sliding box thereof, the screw-threaded rod swiveled in said box, and a wheel, $G^3$, screw-threaded to work upon said rod, substantially as and for the purpose described.

8. The pulleys F, H, and I, the belt E, the pulley G, and the movable box thereof, in combination with the rod swiveled in said box, the screw-threaded sprocket working on the rod, the shaft $G^5$, extending down the side of the frame, and a link-belt connection, $G^4$, between said rod and the sprocket $G^3$, whereby the tension of the belt may be increased or diminished without mounting the frame, substantially as described.

9. The pitmen, the sliding boxes thereof, and the screw-threaded shaft passing through said boxes, in combination with a nut-block, K, having a convex end bearing against the box, substantially as described.

10. The sliding box, the tapering depression on the under side thereof, and the screw-threaded shaft passing through said box, in combination with the nut-block K, fitting in said depression, working on the screw-threaded shaft, and provided with a convex end in contact with the box, substantially as describe 11. The pitmen, the drive-shaft, and sliding box thereof, in combination with an arm, J, rigidly secured to said box, a pulley journaled in said arm, and a pulley on said box, substantially as described.

12. In a saw-carriage, the side bars, in combination with the two-part end bars removably clamped together by bolts, and the saw-blades confined between said end bars and having shoulders embracing the side edges thereof, substantially as described.

JOHN B. GILCHRIST.

Witnesses:
W. W. ELLIOTT,
WILL R. OMOHUNDRO.